(12) United States Patent
Iwao et al.

(10) Patent No.: US 6,252,481 B1
(45) Date of Patent: Jun. 26, 2001

(54) CHIP TYPE ELECTRONIC PART AND METHOD FOR THE MANUFACTURE THEREOF

(75) Inventors: Hidemi Iwao; Mayumi Arai; Kenichi Hoshi; Mutsuo Nakazawa, all of Tokyo (JP)

(73) Assignee: Taiyo Yuden Co. Ltd., Tokyo (JP)

( * ) Notice: Subject to any disclaimer, the term of this patent is extended or adjusted under 35 U.S.C. 154(b) by 0 days.

(21) Appl. No.: 09/451,226

(22) Filed: Nov. 29, 1999

(30) Foreign Application Priority Data

Nov. 27, 1998 (JP) .................................................. 10-336883

(51) Int. Cl.[7] .............................. H01F 5/00; H01F 27/02
(52) U.S. Cl. .............................................. 336/83; 336/200
(58) Field of Search ..................... 336/200, 83; 361/309, 361/321.1–321.5

(56) References Cited

U.S. PATENT DOCUMENTS

| | | | |
|---|---|---|---|
| 4,658,328 | * | 4/1987 | Sakabe .................................. 361/309 |
| 5,144,527 | * | 9/1992 | Amano et al. ..................... 361/321.2 |
| 5,426,560 | * | 6/1995 | Amaya et al. ....................... 361/309 |
| 5,781,402 | * | 7/1998 | Fujiyama et al. ................. 361/321.4 |

FOREIGN PATENT DOCUMENTS

| | | |
|---|---|---|
| 4250607 | 1/1989 | (JP) . |
| 4061106 | 2/1992 | (JP) . |
| 1009607 | 9/1992 | (JP) . |

* cited by examiner

Primary Examiner—Anh Mai
(74) Attorney, Agent, or Firm—Rosenman & Colin, LLP

(57) ABSTRACT

Delamination in the conventional chip-type electronic part may create voids thereinside, allowing an internal electrode therein to vibrate in presence of external impacts or large electromagnetic forces caused by a high frequency current flowing inside the electrode, in such a way that fatigue may accumulate in the internal electrode, which eventually will results in the internal electrode being electrically disconnected. To solve this problem, a chip-type electronic part of the present invention includes synthetic resins impregnated into the voids to secure the internal electrode, wherein external electrodes of the chip-type electronic part are made of a conductive synthetic resin or a porous conductive material formed by sintering a conductive paste. The former is achieved by impregnating the synthetic resins before the formation of the external electrodes and the later, by extending the pores from surfaces of the external electrodes to surfaces of a main body and then by impregnating the synthetic resins thereinto.

18 Claims, 3 Drawing Sheets

CHIP TYPE ELECTRONIC PART AND METHOD FOR THE MANUFACTURE THEREOF

FIELD OF THE INVENTION

The present invention relates to an electronic part for use in an electrical circuit; and, more particularly, to a chip-type electronic part and a method for the manufacture thereof, wherein the chip-type electronic part includes a chip inductor, a chip capacitor, a LC coupled chip or a combination thereof.

DESCRIPTION OF THE PRIOR ART

Generally, a chip-type electronic part includes a chip-type main body and a pair of external electrodes respectively formed on two opposing sides of the main body. The main body is essentially a ceramic composite body with sheet-type internal electrodes placed therein. Some of the internal electrodes have one of their ends exposed at the opposing sides of the main body where the external electrodes are formed, allowing an electrical connection to be made therebetween.

When the chip-type electronic part is a chip inductor, the main body is essentially made of a magnetic material with an internal electrode formed therein having a substantially spiral shape. When the chip-type electronic part is a chip capacitor, the main body may essentially be made of a dielectric material with a plurality of internal electrodes regularly placed therein such a way that the internal electrodes are parallel to each other and separated by the dielectric material constituting the ceramic composite body and one end of each of the electrodes is in contact with either one of the external electrodes.

The above described ceramic composite body is usually formed using the following method: stacking a plurality of ceramic green sheets with electrode patterns formed thereon using a conductive paste, e.g., silver, to thereby form a multi-layered structure; stacking on top and bottom of the multi-layered structure with a plurality of ceramic green sheets without electrode patterns and pressing it, the ceramic green sheets without electrode patterns functioning as the protective layers; dicing the pressed multi-layered structure into chip-type multilayered structures; and sintering the chip-type multi-layered structures.

The external electrodes are respectively formed on two opposing sides of the ceramic composite body by coating thereon a conductive paste material and bake-pasting it. Further, surfaces of the external electrodes are then electroplated to prevent the external electrodes from being damaged by soldering. Presence of electrolytes in the pores located on the surfaces of the ceramic composite body and the external electrodes will degrade the chip's resistance to water, which, in turn, will degrade chip's electric properties. To solve this problem, synthetic resins are applied onto the surfaces of the ceramic composite body and the external electrodes prior to the electroplating process. There are certain deficiencies associated with the above method for manufacturing the chip-type electronic part. During the sintering of the chip-type multi-layered structures to form the ceramic composite body, the ceramic green sheets in the chip-type multi-layered structures may shrink non-uniformally, resulting in a delamination at the interfaces between the neighboring ceramic green sheets or between the ceramic green sheet and the internal electrodes, which will, in turn, result in the formation of voids therebetween. As a result of the delamination, instead of being supported by two ceramic sheets, the internal electrode is supported by only one ceramic sheet, which, in turn, in presence of external impacts, causes the internal electrode to vibrate, resulting in fatigue being accumulated and eventually the internal electrode to be electrically disconnected.

The above described phenomena become more pronounced when the chip-type electronic part is an inductor. For example, when a high frequency current is supplied to the internal electrode, the internal electrode vibrates in the voids as a result of it becoming subjected to rapidly changing electromagnetic field generated by the magnetic material surrounding the internal electrode, resulting in fatigue being accumulated therein and eventually causing it to be electrically disconnected.

SUMMARY OF THE INVENTION

It is, therefore, a primary object of the present invention to provide a chip-type electronic part and a method for the manufacture thereof, the chip-type electronic part being capable of preventing an internal electrode therein from vibrating in presence of external impacts or large rapidly changing electromagnetic forces, thereby keeping it electrically connected.

It is another object of the present invention to provide a method for manufacturing said chip-type electronic part.

In accordance with one aspect of the present invention, there is provided with a chip-type electronic part comprising: a chip-type main body and a pair of external electrodes formed on two opposing sides of the chip-type main body, the main body comprising a ceramic composite body with a sheet-type internal electrode formed therein, wherein the external electrodes are made of a porous conductive material, both ends of the internal electrode are electrically connected to the pair of external electrodes, and synthetic resins are impregnated into voids between the ceramic composite body and the internal electrode and also into the external electrodes.

In accordance with another aspect of the present invention, there is provided a method for manufacturing a chip-type electronic part, the method comprising the steps of: forming a main body including a ceramic composite body with a sheet-type internal electrode; forming a pair of external electrodes made of a porous conductive material on two opposing sides of the main body, wherein the pores in the porous conductive material of the external electrodes extend from surfaces of the external electrodes to surfaces of the main body; impregnating synthetic resins into the main body and the external electrodes by immersing the main body and the external electrodes into a synthetic resin solution; and hardening the impregnated synthetic resins.

In accordance with further aspect of the present invention, there is provided a chip-type electronic part comprising: a chip-type main body and a pair of external electrode formed on two opposing sides of the chip-type main body, the main body including a ceramic composite body with a sheet-type internal electrode placed therein, wherein the external electrodes are made of a conductive synthetic resin, both ends of the internal electrodes are electrically connected to the pair of external electrodes, and synthetic resins are impregnated into the ceramic composite body.

In accordance with still aspect of the present invention, there is provided a method for manufacturing a chip-type electronic part, the method comprising the steps of: forming a main body including a ceramic composite body with a sheet-type internal electrode; impregnating synthetic resins into the main body by immersing the main body into a synthetic resin solution; hardening the impregnated synthetic resins; and forming a pair of external electrodes made of a conductive synthetic resin on two opposing sides of the main body.

BRIEF DESCRIPTION OF THE DRAWINGS

The above and other objects and features of the present invention will become apparent from the following description of preferred embodiments, when given in conjunction with the accompanying drawings, wherein.

DETAILED DESCRIPTION OF THE PREFERRED EMBODIMENTS

Figure 1:
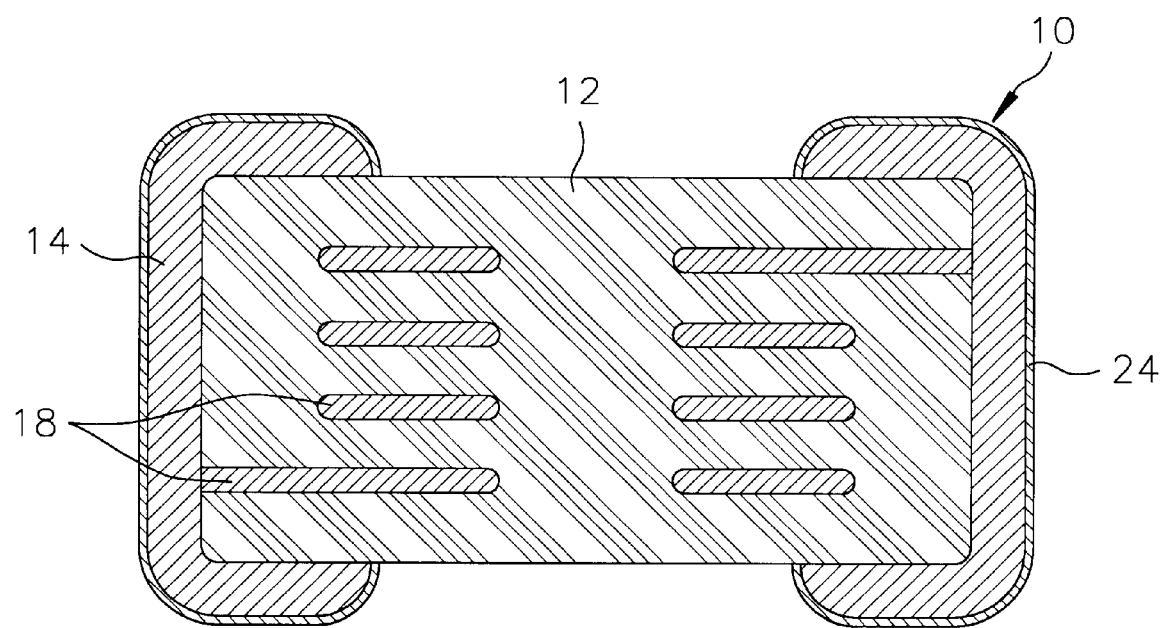
FIG. 1 sets forth a cross sectional view of a chip-type electronic part in accordance with a first embodiment of the present invention.
Figure 2:
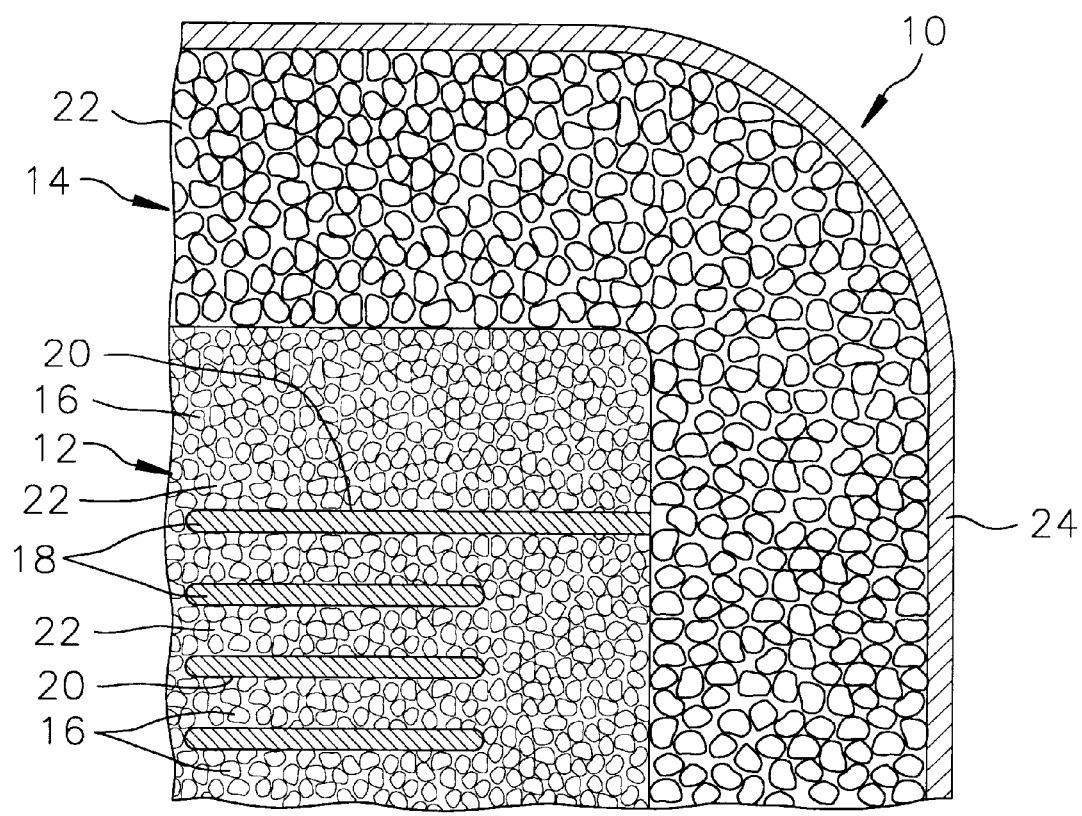
FIG. 2 illustrates a partially enlarged cross sectional view of a chip-type electronic part shown in FIG. 1.

There are shown in FIGS. 1 and 2 a cross sectional view of a chip-type electronic part in accordance with a first embodiment of the present invention and a partially enlarged cross sectional view of the chip-type electronic part in FIG. 1, respectively. As shown in FIGS. 1 and 2, the chip-type electronic part 10 comprises a chip-type main body 12 and a pair of external electrodes 14 formed on two opposing sides of the main body 12. The main body 12 includes a ceramic composite body 16 and sheet-type internal electrodes 18 located therein. Both ends of the internal electrodes 18 are exposed on the two opposing sides of the main body 12, thereby allowing the internal electrodes 18 to be electrically connected to the external electrodes 14.

The ceramic composite body 16 is made of a magnetic material if the chip-type electronic part 10 is an inductor, or is made of a dielectric material if the chip-type electronic part 10 is a chip capacitor. Electrode patterns formed using a conductive paste including therein, e.g., Ag or Ag—Pd powders, are sintered to form the internal electrode 18.

The external electrodes 14 are made of a porous conductive material, the porous conductive material being formed by the coating a conductive paste including therein, e.g., Ag or Ag—Pd powders, on the two opposing sides of the main body 12 and bake-pasting it using a heat-treatment. The pores in the porous conductive material of the external electrodes 14 extend from the surface of the external electrodes 14 to the surface of the main body 12.

Voids formed at the interfaces between the ceramic composite body 16 and the internal electrode 18 are impregnated with a synthetic resin 22 including, e.g., silicone resin, epoxy resin, phenol resin or other plastics.

Also, the synthetic resins 22 are impregnated into the main body 12 and the external electrodes 14. The impregnated synthetic resins 22 of the main body 12 are continuously linked to those of the external electrodes 14. Additionally, a plate layer 24 is formed on the surface of the external electrodes 14 by using an electroplating method.

The above described chip-type electronic part is fabricated using the following steps: forming a main body 12 including a ceramic composite body 16 with sheet-type internal electrodes 18 placed therein; forming a pair of external electrodes 14 on two opposing sides of the main body 12; impregnating synthetic resins 22 by dipping the main body 12 and the external electrodes 14 into a synthetic resin solution; and hardening the impregnated synthetic resins 22.

The above described main body 12 is fabricated using the following steps: stacking a plurality of ceramic green sheets each having an electrode pattern made of a conductive paste including, e.g., Ag or Ag—Pd powders, printed thereon, thereby forming a multi-layered structure; stacking on top and bottom of the multi-layered structure with a plurality of ceramic green sheets without an electrode pattern printed thereon to form protective layers; pressing the multi-layered structure provided with the protective layers; dicing the pressed multi-layered structure into a chip-type multi-layered structures; and sintering the chip-type multi-layered structures to form the main body.

The external electrodes 14 made of a porous conductive material are formed on two opposing sides of the main body 12 by coating a conductive paste including, e.g., Ag or Ag—Pd powders, and bake-pasting it thereon using a heat-treatment. The conductive paste has a specific composition which will allow the pores of the external electrodes 14 to extend from the surface of the external electrodes 14 to the surface of the main body 12.

Figure 3:
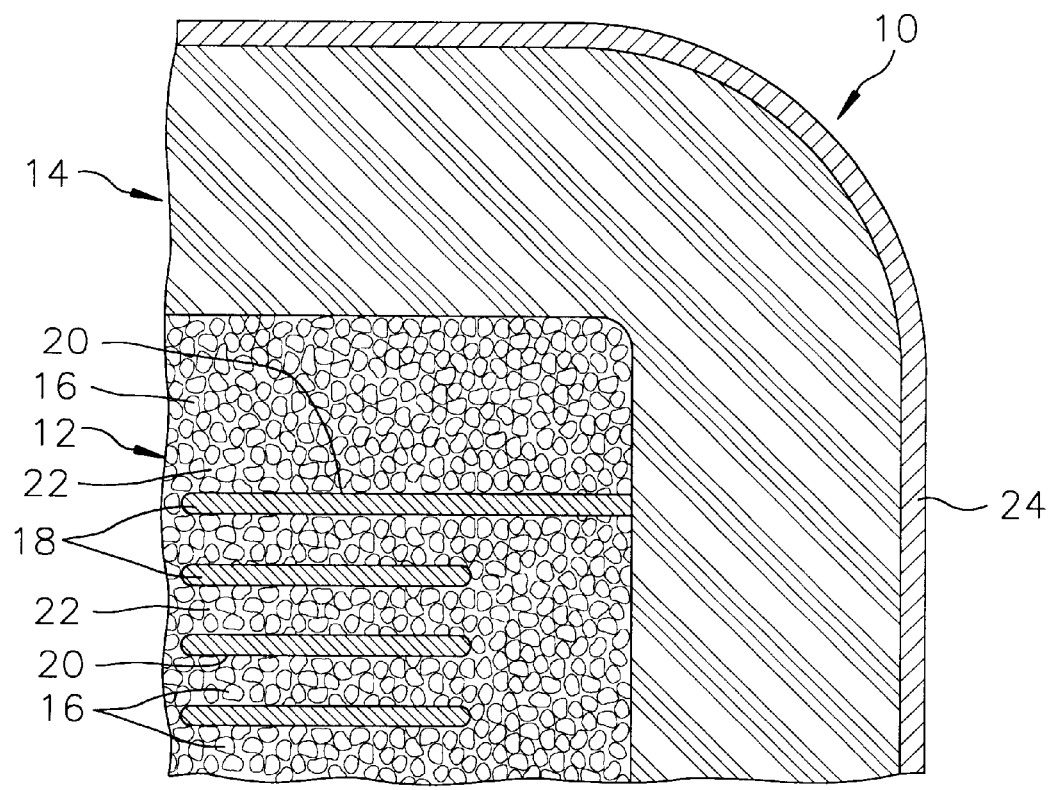
FIG. 3 depicts a partially enlarged cross sectional view of a chip-type electronic part in accordance with a second embodiment of the present invention.

FIG. 3 is a partially enlarged cross sectional view setting forth a chip-type electronic part in accordance with a second embodiment of the present invention. As shown in FIG. 3, the second embodiment is similar to the first embodiment, except that the external electrodes 14 of the second embodiment are made of a conductive synthetic resin instead of the porous conductive material of the first embodiment. The conductive synthetic resin is made of, e.g., a conductive paste including a thermosetting epoxy system, or other conductive synthetic resins.

The fabrication of the chip-type electrical part 10 comprises the steps of: forming a main body 12 including a ceramic composite body 16 with sheet-type internal electrode 18 located therein; impregnating synthetic resins 22 by dipping the main body 12 into a synthetic resin solution; hardening the synthetic resins 22; forming a pair of external electrodes 14 by coating a conductive synthetic resin on two opposing sides of the main body 12; and forming a plate layer 24 by using an electroplating method.

EXAMPLE 1

First, a mixture of powders of $Fe_2O_3$, NiO, ZnO and CuO in the molar ratio described below is mixed together in water ball milled and dried using a spray dryer.

| class of oxide | molar rate |
| --- | --- |
| $Fe_2O_3$ | 49 mol % |
| NiO | 35 mol % |
| ZnO | 10 mol % |
| CuO | 6 mol % |

Next, the dried mixture is calcined at a temperature of 800° C. for 1 hour to obtain desired ferrite powders. The ferrite powders are then ground, mixed with water and ball-milled for 15 hours to obtain a slurry, which is to be spray dried.

Thereafter, the spray dried ferrite powders are mixed with an organic binder and an organic solvent to obtain a slurry thereof. A plurality of ferrite green sheets, each having a thickness of 50 μm, are then formed using a doctor blade method from the slurry.

Subsequently, via holes and electrode patterns are formed on the ferrite green sheets. The ferrite green sheets are stacked, with the electrode patterns thereon being electrically connected to each other through the via holes to form a spiral-type coil.

The conductive paste for forming the electrode patterns has the following composition:

| Ag powders (as spherical particles having an average diameter of 0.3 μm) | 70 wt % |
|---|---|
| ethyl-cellulose | 9 wt % |
| butylcarbitol | 19 wt % |
| thickener | 2 wt % |

The ferrite green sheets are appropriately stacked to form a multi-layered structure having the spiral-type coil therein, wherein the coil has 10 turns. Then, the multilayered structure is diced and sintered at a temperature of 900° C., to obtain a main body.

Thereafter, a pair of external electrodes is formed by coating a conductive paste on two opposing sides of the main body and is bake-pasted by using a heat treatment at a temperature of 600° C., thereby forming a semifinished multi-layer chip inductor.

The conductive paste used in forming the external electrodes has a composition as described hereinbelow:

| Ag powder (as spherical particles having an average diameter of 0.5 μm) | 73 wt % |
|---|---|
| glass-frit ($ZnO-B_2O_3-SiO_2$) | 4 wt % |
| ethyl-cellulose | 10 wt % |
| mixture solution (butylcarbitol acetate and ethylcarbitol) | 13 wt % |

Subsequently, silicone resins are impregnated into the semifinished multi-layered chip inductor, using the method described hereinbelow: filling a vessel with a silicone resin solution diluted with a toluene; immersing the semifinished multi-layer inductor chip in the vessel; putting the vessel in a pressure-control container; lowering the pressure of the container to a pressure of 30 Torr by using a vacuum pump; and maintaining it for 10 minute.

Then, the semifinished multi-layer chip inductor is removed from the vessel and is heat-treated at a temperature of 200° C. for 1 hour so as to harden the impregnated silicone resins.

Finally, after removing the silicone resin adhered to the surface of the external electrodes using a rotating barrel, a plate layer is formed on the surface of the external electrode by using an electroplating method.

A microscopic examination of the sections around the internal electrode of the multi-layer inductor chip fabricated using the above described processes indicates the internal electrode is supported by the impregnated silicone resins.

EXAMPLE 2

A main body in Example 2 is formed using the steps described above for Example 1.

Next, silicon resins are impregnated into the magnetic composite material using the steps described hereinbelow: filling a vessel with a silicone resin solution diluted by toluene; immersing a main body in the vessel; putting the vessel in a pressure-control container; lowering the pressure of the container to a pressure of 30 Torr by using a vacuum pump; and maintaining it for 10 minute.

Thereafter, the impregnated main body is removed from the vessel and heat-treated at a temperature of 200° C. for 1 hour so as to harden the impregnated silicone resins impregnated.

Then, the silicone resin adhered to the surface of the main body is removed in a rotating barrel.

Subsequently, a pair of external electrodes is formed on two opposing sides of the main body by coating a conductive paste of a thermosetting epoxy system and hardening it at temperatures of 150° C. for 60 minute and 200° C. for 30 minute. Then, a plate layer is formed by using an electroplating method, thereby forming a multi-layered chip inductor.

A microscopic examination of a section around the internal electrode of the multi-layer inductor chip fabricated using the method described above confirms that the internal electrode is supported by the impregnated silicone resins.

In contrast with the chip-type electronic part previous disclosed, the present invention includes the synthetic resin impregnated into the main body, the impregnated resins supporting the internal electrodes to prevent the internal electrodes from vibrating when an external impact or extremely transducing electromagnetic force is applied thereto, preventing the internal electrodes from being fatigued, resulting in increasing the reliance of the chip-type electronic part.

In addition, the impregnated synthetic resins improve the coherency between the ferrite sheets of the multi-layered structure, which will, in turns, prevent the delamination between the ferrite sheets, increasing the reliability of the chip-type electronic part.

Furthermore, the present invention includes the external electrodes made of the porous conductive material, making it possible and easy to impregnate the main body with the synthetic resins through the external electrodes. Further, the impregnated synthetic resins of the external electrodes are continuously linked to those of the main body, improving the adhesivity between the external electrodes and the main body.

Normally, the impregnation of the synthetic resins should be carried after the step of bake-pasting the external electrodes on the main body by using the heat treatment so as to prevent the synthetic resin from being damaged during the heat treatment. However, in one embodiment of the present invention, wherein the external electrodes are formed from the conductive synthetic resin, the step of impregnating the synthetic resins into the main body is carried out before the formation of the external electrodes, resulting in eliminating the step of bake-pasting the external electrodes on the main body by using the heat treatment, which, facilitating the impregnation of the synthetic resins into the main body.

While the present invention has been described with respect to certain preferred embodiments only, other modifications and variations may be made without departing from the scope of the present invention as set forth in the following claims.

What is claimed is:

1. An electronic part comprising:
    a main body and a pair of external electrodes formed on two opposing sides of the main body, the main body including a ceramic composite body with an internal electrode formed therein,
    wherein both ends of the internal electrode are electrically connected to the pair of external electrodes, and synthetic resins are impregnated into voids formed at the interfaces between the ceramic composite body and the internal electrode, whereby a delamination at the interfaces between the ceramic composite body and the internal electrode is prevented, increasing the reliability of the electronic part.

2. The electronic part of claim 1, wherein the external electrodes are made of a porous conductive material and the synthetic resins are impregnated into the external electrodes.

3. The electronic part of claim 2, wherein the impregnated synthetic resins of the external electrodes are continuously linked to those of the main body, whereby the adhesivity between the external electrodes and the main body is increased.

4. The electronic part of claim 2, wherein pores in the porous conductive material of the external electrodes extend from surfaces of the external electrodes to surfaces of the main body.

5. The electronic part of claim 4, wherein the impregnated synthetic resins of the external electrodes are continuously linked to those of the main body. whereby the adhesivity between the external electrodes and the main body is increased.

6. A method for manufacturing the electronic part in claim 4, comprising the steps of:

forming the main body including the ceramic composite body with the internal electrode;

forming the pair of external electrodes made of the porous conductive material on the two opposing sides of the main body;

impregnating the synthetic resins into the main body and the external electrodes by immersing the main body and the external electrodes into a synthetic resin solution; and hardening the impregnated synthetic resins.

7. The method of claim 6, wherein the step of impregnating the synthetic resins is carried out under a reduced pressure lower than the atmospheric pressure.

8. The method of claim 7, wherein the reduced pressure is about 30 torr.

9. The electronic part of claim 1, wherein the synthetic resins are impregnated into the ceramic composite body.

10. The electronic part of claim 1, wherein the external electrodes are made of a conductive synthetic resin and the synthetic resins are impregnated into the ceramic composite body.

11. A method for manufacturing the electronic part in claim 10, comprising the steps of:

forming the main body including the ceramic composite body with the internal electrode;

impregnating the synthetic resins into the main body by immersing the main body into a synthetic resin solution;

hardening the impregnated synthetic resins; and forming the pair of external electrodes made of the conductive synthetic resin on the two opposing sides of the main body.

12. The method of claim 11, wherein the step of impregnating the synthetic resins is carried out under a reduced pressure lower than the atmospheric pressure.

13. The method of claim 12, wherein the reduced pressure is about 30 torr.

14. The electronic part of claim 1, wherein the synthetic resins are impregnated under a reduced pressure lower than the atmospheric pressure.

15. The electronic part of claim 14, wherein the reduced pressure is about 30 torr.

16. A method for manufacturing an electronic part, the method comprising the steps of:

forming a main body including a ceramic composite body with an internal electrode;

forming a pair of external electrodes made of a porous conductive material on two opposing sides of the main body, wherein pores in the porous conductive material of the external electrodes extend from surfaces of the external electrodes to surfaces of the main body;

impregnating synthetic resins into voids formed at the interfaces between the ceramic composite body and the internal electrode and the external electrodes by immersing the main body and the external electrodes into a synthetic resin solution; and hardening the impregnated synthetic resins.

17. An electronic part comprising:

a main body and a pair of external electrode formed on two opposing sides of the main body, the main body including a ceramic composite body with an internal electrode placed therein, wherein the external electrodes are made of a conductive synthetic resin, both ends of the internal electrodes are electrically connected to the pair of external electrodes, and synthetic resins are impregnated into the ceramic composite body.

18. A method for manufacturing an electronic part, the method comprising the steps of:

forming a main body including a ceramic composite body with an internal electrode;

impregnating synthetic resins into the ceramic composite body by immersing the main body into a synthetic resin solution;

hardening the impregnated synthetic resins; and forming a pair of external electrodes made of a conductive synthetic resin on two opposing sides of the main body.

* * * * *